(12) United States Patent
Ghavamzadeh (10) Patent No.: US 11,100,530 B2
(45) Date of Patent: Aug. 24, 2021

(54) BANDIT ALGORITHM FOR K-BEST OPTION IDENTIFICATION

(71) Applicant: Adobe Inc., San Jose, CA (US)

(72) Inventor: Mohammad Ghavamzadeh, San Jose, CA (US)

(73) Assignee: Adobe Inc., San Jose, CA (US)

( * ) Notice: Subject to any disclaimer, the term of this patent is extended or adjusted under 35 U.S.C. 154(b) by 890 days.

(21) Appl. No.: 15/609,866

(22) Filed: May 31, 2017

(65) Prior Publication Data

US 2018/0349943 A1 Dec. 6, 2018

(51) Int. Cl.
*G06Q 30/02* (2012.01)
(52) U.S. Cl.
CPC ..... *G06Q 30/0242* (2013.01); *G06Q 30/0202* (2013.01); *G06Q 30/0244* (2013.01); *G06Q 30/0254* (2013.01)

(58) Field of Classification Search
None
See application file for complete search history.

(56) References Cited

U.S. PATENT DOCUMENTS

| 2013/0097245 | A1* | 4/2013 | Adarraga | G06F 3/0482 709/204 |
| 2014/0344013 | A1* | 11/2014 | Karty | G06Q 30/0201 705/7.29 |
| 2016/0373510 | A1* | 12/2016 | Sreevalsan | H04L 43/04 |

OTHER PUBLICATIONS

Yan Zhu, Irrevocable-choice algorithms for sampling from a stream, Feb. 28, 2016, Springer, Data Min Knowl Disc (2016) (Year: 2016).*

Kalyanakrishnan, et al., "PAC Subset Selection in Stochastic Multi-armed Bandits," Proceedings of the 29th International Conference on Machine Learning, 2012. pp. 655-662.

* cited by examiner

*Primary Examiner* — Jerry O'Connor
*Assistant Examiner* — Matthew H Divelbiss
(74) *Attorney, Agent, or Firm* — Finch & Maloney PLLC (57) ABSTRACT

Techniques are provided for k-best option identification of options subject to a supplied tolerance. One technique includes: sampling the options for a first period on a plurality of computers; computing an average and a sample count for each option based on the sampling; splitting the options into a highest group and a lowest group based on the computed averages; selecting a weakest one of the highest group (option A) and a strongest one of the lowest group (option B); and deciding whether or not to terminate based on the supplied tolerance and the selecting of options A and B. In some cases, the technique further includes outputting the highest group and terminating in response to a termination decision; otherwise continue with sampling options A and B for a next period; and updating the computed average and the sample count for options A and B based on corresponding next period sampling.

20 Claims, 6 Drawing Sheets

BANDIT ALGORITHM FOR K-BEST OPTION IDENTIFICATION

FIELD OF THE DISCLOSURE

This disclosure relates to a bandit algorithm for k-best option identification and, more particularly, to using such an algorithm to identify which changes to a given marketing campaign will allow that campaign to perform more effectively.

BACKGROUND

Most industrial hypothesis testing products, such as Adobe Target (Adobe is a registered trademark of Adobe Systems, Inc.), formulate a multiple hypothesis testing problem as a set of tests in which each option is compared with a base option. In this case, the problem is formulated as a set of tests (A vs. B), (A vs. C), (A vs. D), etc., and type I and type II errors are defined based on how many of these tests are decided correctly. This formulation makes sense if the analyst is interested in knowing which of the alternative options B, C, D, etc., provides a lift over the base option A, or which of the options do not. However, in many practical multiple hypothesis testing scenarios, the analyst is instead interested in identifying the best (or k best) in a set of options. The goal in this scenario is to select the top option (or top k options) in a way that the probability of error in the selection remains small. Accordingly, in this problem, type I and type II errors, which are common in standard hypothesis testing, are replaced with a probability of error. This feature does not exist in most testing products, and a practical approach to handle this scenario is needed.

BRIEF DESCRIPTION OF THE DRAWINGS

Features of embodiments of the claimed subject matter will become apparent as the following Detailed Description proceeds, and upon reference to the Drawings, wherein like numerals depict like parts.

Although the following Detailed Description will proceed with reference being made to illustrative embodiments, many alternatives, modifications, and variations thereof will be apparent to those in light of the present disclosure.

DETAILED DESCRIPTION

One or more embodiments of the present disclosure are directed to providing an efficient decentralized approach to selecting the k best options from a set of alternative options. For example, the alternative options can be different versions of the same e-commerce webpage, while the k best options can be those versions of the webpage that get the desired response from visitors of the webpage, such as a click-through to a customer webpage. Brute force uniform random sampling of every possible option can be wasteful of sampling resources or otherwise impractical. On the other hand, precision approaches (such as bandit algorithms) for minimizing sampling can produce highly centralized solutions that are too impractical to implement in decentralized environments such as e-commerce marketing campaigns run on content delivery networks. Such sampling-minimizing techniques are also directed to general events (e.g., as likely as not to happen) and not the relatively low-probability conversion rates that characterize most conversion marketing environments. One or more embodiments of the present disclosure address such unresolved issues and provide for sampling-efficient techniques that effectively combine the benefits of large decentralized uniform sampling with the precision sampling control of bandit algorithms and that perform well on low probability events such as click-throughs in conversion marketing.

In applications like an online or e-commerce marketing campaign, advertisers look for ways to improve the conversion rate of a webpage. In one sense, the conversion rate is the rate of converting visitors of a webpage to customers of the webpage's sponsor. In another sense, the conversion rate can apply to any activity related to converting visitors to customers, such as the click-through rate (CTR) of a particular link on the webpage. The webpage sponsor may be interested in knowing which of M alternative options (e.g., changes to the web site) will perform more effectively, such as lead to greater CTRs. For instance, the sponsor may be interested in knowing the top k alternative options. Here, k is some number less than M. When k=1, the sponsor is looking for the best alternative option. This is an example of a multiple hypothesis test. Uniform sampling of each of the options on different sets of webpage visitors is one way to do a multiple hypothesis test, but can be very wasteful of sampling resources (e.g., have a large sampling complexity, such as requiring a large number of samples). Alternatively, multi-arm bandit algorithms can reduce or minimize the sampling complexity, but their centralized approach and general data assumptions make them impractical for most industrial multiple hypothesis testing.

Accordingly, in one or more embodiments of the present disclosure, sampling complexity for k best option identification is reduced or minimized compared to other techniques, especially in real-life multiple hypothesis situations using decentralized computing resources and experiencing small conversion rates. In one embodiment of the present disclosure, a multiple-computer-implemented method of k-best option identification is provided. The k-best option identification is subject to a supplied tolerance of correctness and a supplied confidence of falling within the tolerance of correctness. The method includes sampling each of a plurality of options for a first period on each of a plurality of computers. The method further includes computing an average and a sample count for each of the options based on the corresponding first period sampling of the options on each of the computers. The method further includes splitting the options into a highest group including k of the options and a lowest group including remaining ones of the options. The computed average of each of the highest group is no less than the computed average of each of the lowest group. The method further includes selecting a weakest one of the highest group (option A) and a strongest one of the lowest group (option B). The selecting is based on the computed averages, the sample counts, and the supplied confidence of falling within the tolerance. Option A is one of the highest group for which there is least confidence that option belongs in the highest group. Option B is one of the lowest group for which there is least confidence that option belongs in the lowest group. The method further includes deciding whether or not to terminate based on the supplied tolerance and the selecting of options A and B. The method further includes outputting the highest group after deciding to terminate. Otherwise, the method further includes: further sampling each of options A and B for a next period on each of the computers; updating the average and the sample count for each of options A and B based on corresponding said next period sampling of the option on each of the computers; and repeating the splitting, the selecting, the deciding, and either the outputting or the further sampling and the updating based on the latest termination decision.

General Overview

A multi-arm bandit problem is somewhat analogous to the k-best option identification of multiple hypothesis testing. In the multi-arm bandit problem, there are M levers (arms) that can be pulled, one at a time, each arm returning a random amount, such as a random variable whose distribution, e.g. expected value (mean) and standard deviation, can vary from arm to arm. For ease of description, throughout, it will be assumed that such distributions are Bernoulli distributions. That is, each random variable takes on the value 1 with probability p and the value 0 with probability 1−p, where p stays fixed between 0 and 1 for each random variable but can vary between random variables. The goal of the multi-arm bandit problem is to optimize the selection of pulls to maximize the return. An ideal solution to the multi-arm bandit problem is (1) select the best returning arm (e.g., the arm with the highest value of p) and (2) always pull that arm. However, the distributions are not known up front, and can only be estimated through sampling. Accordingly, the best returning arm is never known with certainty, but can be guessed with greater certainty through more sampling of the different arms.

A multi-arm bandit algorithm thus spends some of its time determining the best returning arm (exploration) and some of its time pulling the best arm found so far (exploitation). The exploration portion of a multi-arm bandit algorithm may thus be adaptable to identifying the k best options (with the case k=1 representing identifying the best option). One such multi-arm bandit algorithm is the lower and upper confidence bound (LUCB) algorithm described in Kalyanakrishnan et al., "PAC Subset Selection in Stochastic Multi-Armed Bandits," in Langford, Pineau, editors, *Proceedings of the 29th International Conference on Machine Learning*, pp. 655-662, Omnipress, New York, N.Y., USA, 2012 (hereinafter "LUCB paper"), the entire contents of which is herein incorporated by reference. However, LUCB is a localized approach directed to general bounded random variables. LUCB is not appropriate for decentralized processing on events such as random variables having small expected values (means or conversion rates) that are of interest in industrial hypothesis testing.

Thus, and in accordance with an embodiment, a technique for identifying the k best options using a decentralized multiple hypothesis testing of events having Bernoulli distributions with small conversion rates is provided. This technique can distribute the workload over multiple edge servers (as in a content delivery network), finish quickly when presented events having small conversion rates, and reduce or minimize sampling complexity similar to that achieved in multi-arm bandit techniques.

Architecture and Methodology

LUCB and the techniques described herein are PAC (probably approximately correct) approaches. By "approximately correct," it is meant that the exact or correct solution may not necessarily be provided by the technique. However, the solution provided can be made arbitrarily close to (e.g., within any defined proximity of) the correct solution through sufficient sampling (e.g., higher sampling complexity). In a similar fashion, by "probably," it is meant that even when the solution provided is sufficiently close to the correct solution, this is not necessarily always the case. However, the certainty that the solution provided is sufficiently close to the correct solution can be made arbitrarily close to 100% (e.g., greater than any predefined percentage less than 100%) through sufficient sampling (e.g., higher sampling complexity). Put another way, PAC solutions are not necessarily correct, because of the practicalities inherent in statistical sampling. Nonetheless, they can suffice for real life applications by doing sufficient sampling to produce desired accuracy and confidence levels.

Figure 1:
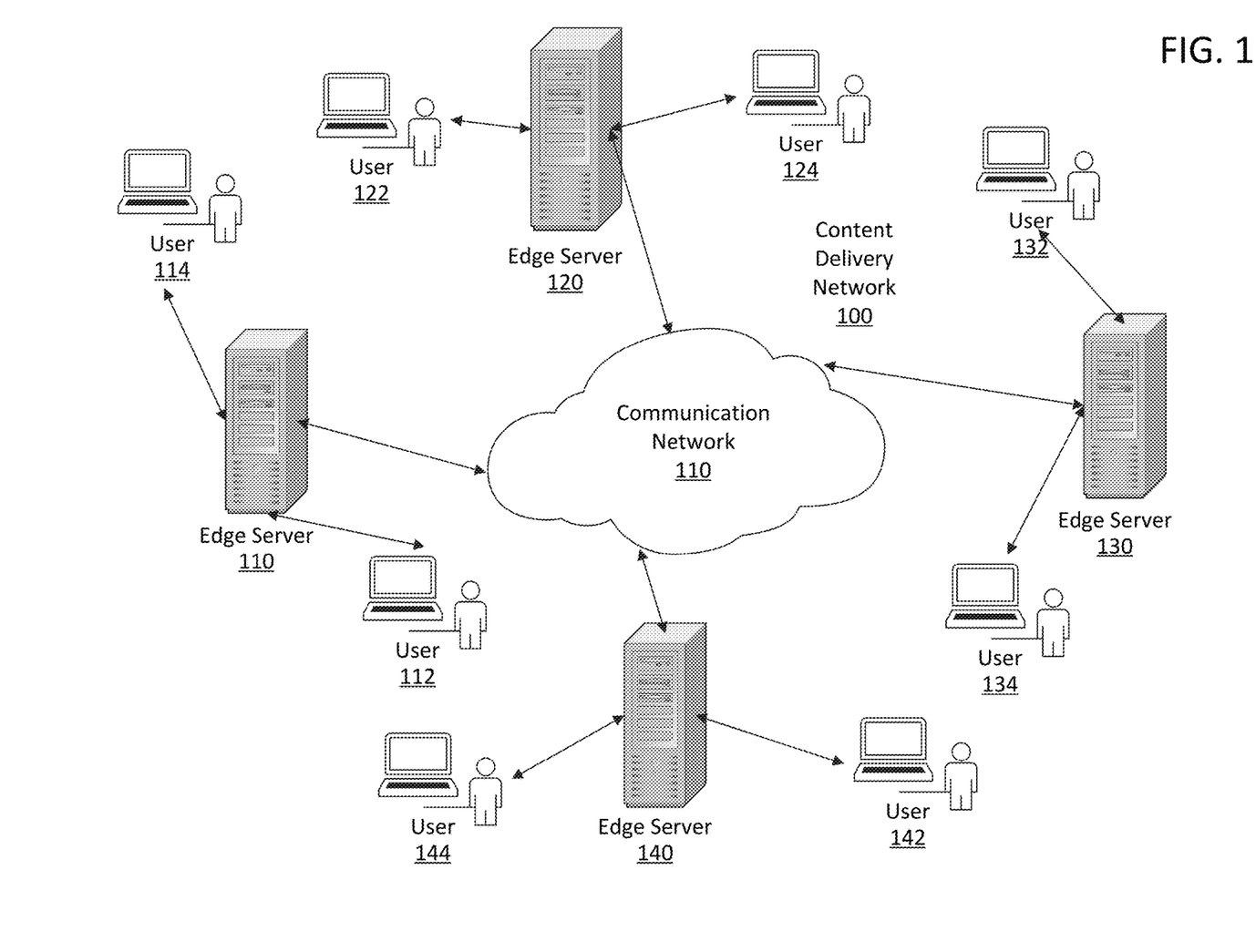
FIG. 1 is a schematic diagram illustrating an example content delivery network (CDN) for implementing one or more embodiments of the present disclosure.

FIG. 1 is a schematic diagram illustrating an example content delivery network (CDN) 100 for implementing one or more embodiments of the present disclosure. The CDN 100 makes use of a communication network 110 (such as the Internet) to decentralize the computing resources, in this case edge servers 110, 120, 130, and 140. The edge servers 110, 120, 130, and 140 are for delivering content, such as Internet content (e.g., web sites), to users 112, 114, 122, 124, 132, 134, 142, 144, and their associated computing equipment (e.g., personal computers, laptops, tablets, smartphones, and so on). The users 112 through 144 may be distributed, for example, throughout the world or throughout a country, and receive content from an edge server that is perhaps geographically close to or otherwise more convenient to access than the other edge servers. For example, users 112 and 114 receive content from edge server 110, users 122 and 124 receive content from edge server 120, users 132 and 134 receive content from edge server 130, and users 142 and 144 receive content from edge server 140. When performing some embodiments of the present disclosure, one of the edge servers, such as edge server 110, may act as a master (or master computer or master edge server), delegating some of the work to the other edge servers 120, 130, and 140, and consolidating the results from all the edge servers.

In other embodiments, a separate master server (not necessarily an edge server) delegates work and consolidates results. In still other embodiments, another distributed computing network (not necessarily a CDN) is used to implement one or more of the disclosed techniques. For ease of description, however, it will be assumed throughout that a CDN is used to implement example embodiments of the present disclosure, and that one of the edge servers serves as the master edge server.

Figure 2:
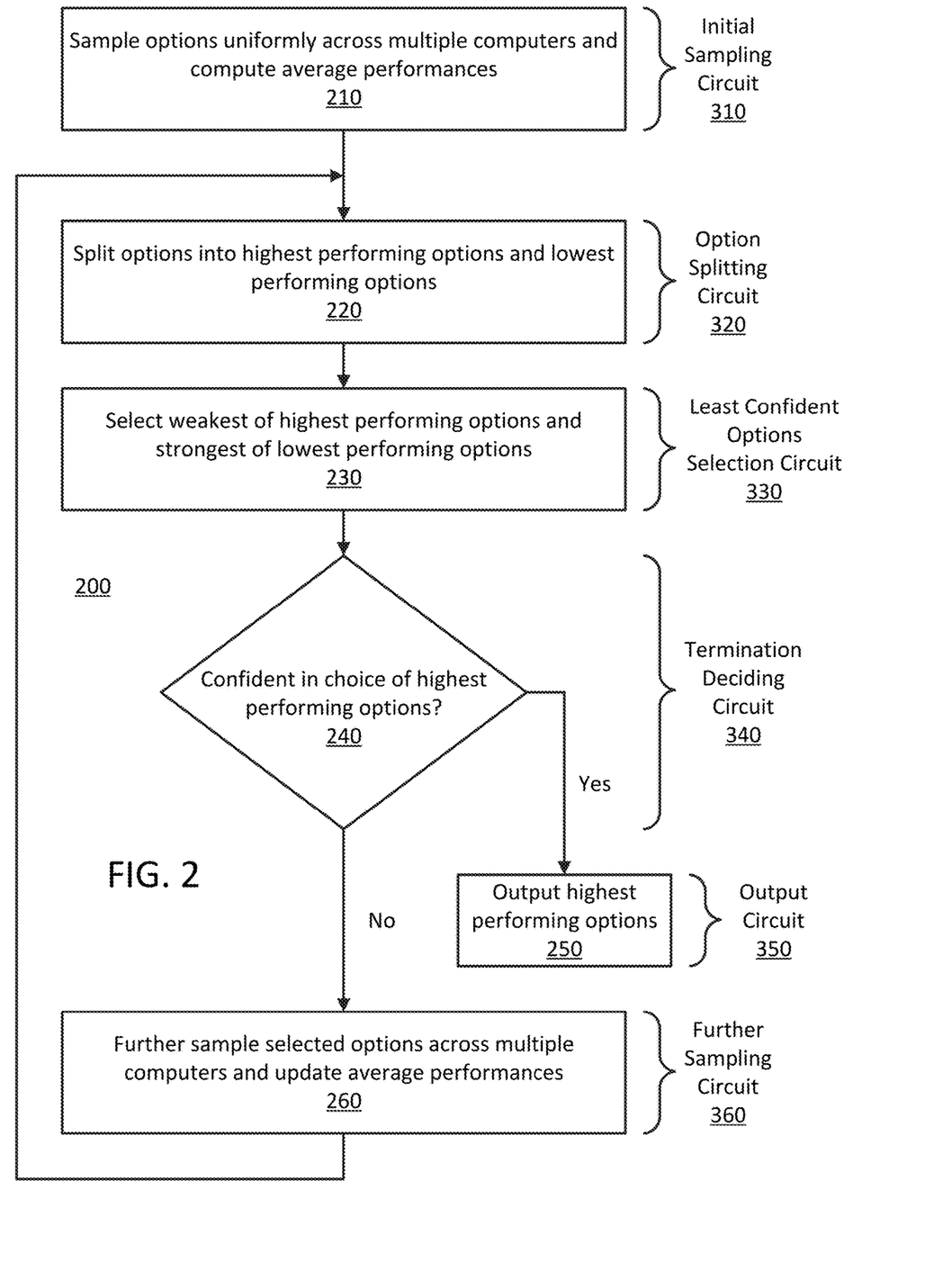
FIG. 2 is a flowchart illustrating an example computer-based method of k-best option identification according to an embodiment of the present disclosure.
Figure 3:
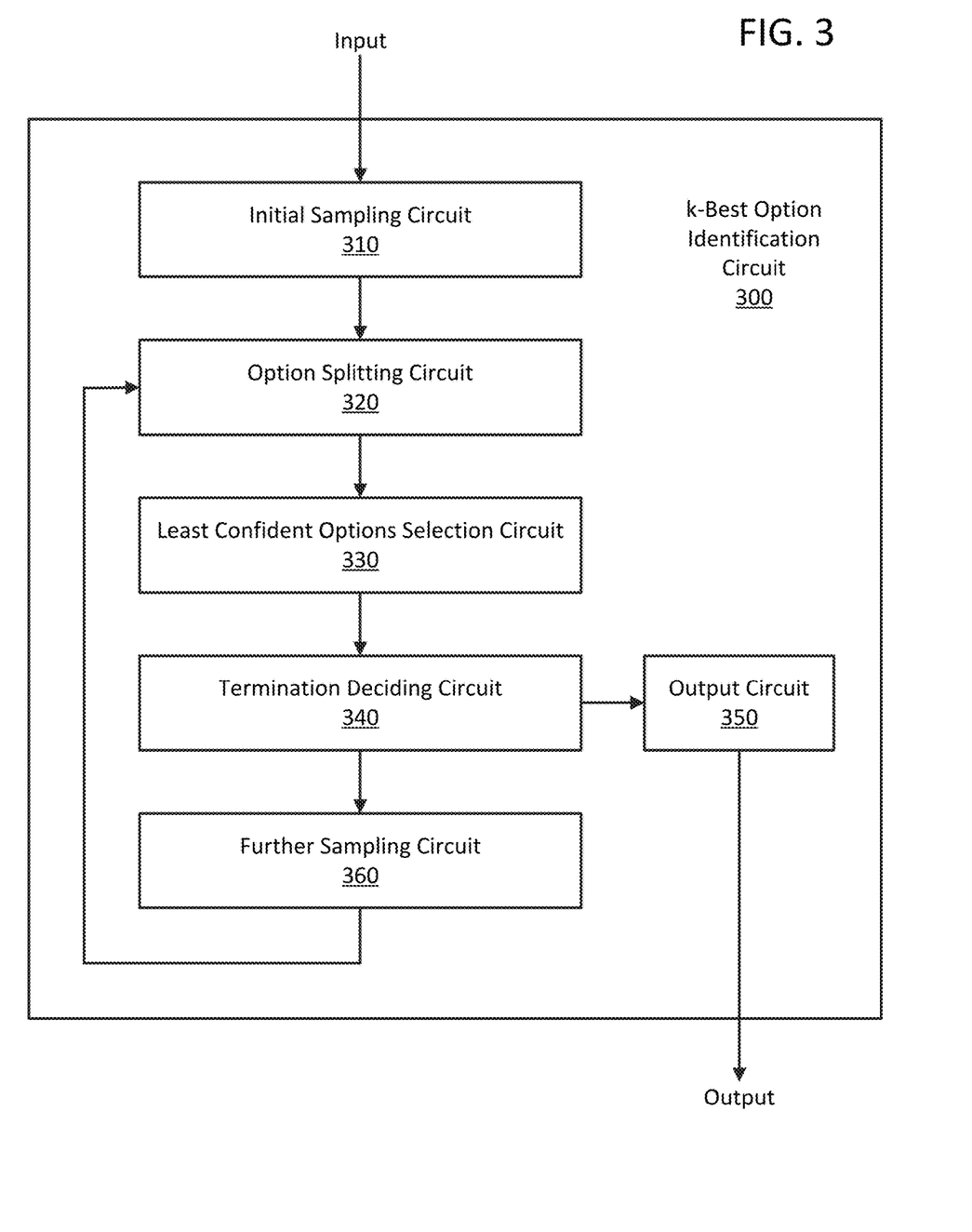
FIG. 3 is a block diagram of an example k-best option identification circuit according to an embodiment of the present disclosure.

FIG. 2 is a flowchart illustrating an example computer-based method 200 of k-best option identification according to an embodiment of the present disclosure. FIG. 3 is a block diagram of an example k-best option identification circuit 300 according to an embodiment of the present disclosure. The method 200 and other methods described herein may be implemented in hardware or software, or some combination of the two. For example, the method 200 may be implemented by the k-best option identification circuit 300 of FIG. 3. In another embodiment, the method 200 may be implemented by a custom circuit such as a field programmable gate array (FPGA) configured to carry out the method 200.

In some other embodiments, the method 200 may be implemented as a series of computer instructions, such as software, firmware, or a combination of the two, together with one or more computer processors (e.g., one or more microprocessors). The instructions, when executed on a given processor, cause the method 200 to be performed. For example, in one or more embodiments, a computer program product is provided. The computer program product includes one or more non-transitory machine readable mediums (such as a compact disc, a DVD, a solid-state drive, a hard drive, RAM, ROM, on-chip processor cache, or the like) encoded with instructions that when executed by a plurality of computers cause the method 200 (or other method described herein) to be carried out for k-best option identification.

As will be appreciated, the method may be carried out in a distributed manner (on more than one computing system, in at least some respects, such as the sampling at 210). In addition, while the methods described herein may appear to have a certain order to their operations, other embodiments may not be so limited. Accordingly, the order of the operations can be varied between embodiments, as would be apparent in light of this disclosure. For ease of description, it will be assumed that method 200 is implemented on a set of edge servers, one of the edge servers acting as a master to coordinate distributing work to and collecting results from the other edge servers.

In a similar light, the identification circuit 300 and other circuits disclosed herein may be custom hardware circuits or general purpose computer hardware configured (e.g., through software, firmware, customized logic, to name a few) to carry out the tasks assigned to the circuit. While circuits are illustrated as being made up of other circuits by function, in other embodiments, two or more circuits may be combined into a single circuit performing the functionality of the two or more circuits. In still other embodiments, a single circuit can be divided into two or more circuits, each performing separate functions performed by the single circuit. For example, each of the edge servers, or perhaps just the master edge server, of a CDN may include the identification circuit 300, while other edge servers may include only selected circuits of the identification circuit 300.

Referring to the method 200 of FIG. 2, processing begins with sampling 210 each of the options uniformly across multiple computers (e.g., edge servers) and computing their average performances. For example, there may be M different options to compare to the base option in the multiple hypothesis test. For ease of description, the described embodiments will be primarily discussed using an online marketing campaign (such as M different alternatives to an existing webpage having a click-through link, the webpages being measured by CTRs over periods of time, e.g., three hours, or numbers of visitors), but other embodiments are not so limited. Since any of the M options may be the best option (or one of the best k options), each of the options should be sampled to be sure they are not the best option (or one of the best k options). By initially doing uniform sampling of each of the M options, each option gets a baseline average value (also referred to as performance or mean), for example, a small number like 0.02 or 2% for webpage CTRs. These numbers can in turn be compared to the base option, e.g., the webpage without any of the modifications.

For example, each of the M options can be run for three hours on a separate set of visitors to the webpage, and the CTRs measured for each option. For workload distribution, each of the edge servers can do some of the sampling for each of the M options, such as alternating the different options to different visitors of the webpage. In this fashion, the sampling is geographically diverse for each option, and the load on the edge servers fairly balanced (at least with respect to each option). After sampling, each edge server can communicate the collected information, such as number of samples (e.g., visitors), number of conversions (e.g., click-through's), and so on, to the master edge server. For the online marketing scenario, performance may be measured by the CTRs of the options, but the number of visitors and the number of click-through's (i.e., the components of the CTRs) may need to be tracked for each of the M options, as will become apparent with further description. The option sampling 210 and average performance computing may be performed, for example, by an initial sampling circuit 310 (e.g., part of the option identification circuit 300 of FIG. 3). The initial sampling circuit 310 may be part of all of the edge servers.

The method 200 then proceeds with splitting 220 the options into two groups: the highest performing option (or k highest performing options) and the remaining (e.g., lowest performing) options. This can be based, for example, on the average (or empirical) CTRs measured so far. The option splitting 220 may be performed, for example, by an option splitting circuit 320 of FIG. 3 on the master edge server. The other edge servers may not be aware of the option splitting 220.

Next, the method 200 proceeds with selecting 230 the weakest of the highest performance options and the strongest of the lowest performing options. For k=1, the current highest performing option is always selected. By "weakest," what is meant is the highest performing option for which there is the least confidence that option belongs in the highest performing group. This can be for many reasons. For example, the weakest of the highest performing options may have relatively few samples, so its average performance may be subject to a great swing (such as a great downward swing) with more sampling. For another example, the weakest of the highest performing options may have an average performance only marginally better than the strongest of the lowest performing options. Accordingly, even a slight decrease in the average performance of the weakest of the highest performing options may make it one of the lowest performing options.

Likewise, "strongest" has a similar meaning for the lowest performing group, only in this case, the roles are reversed. For instance, the strongest of the lowest performing options may have relatively few samples, so its average performance may also be subject to a great swing (such as a great upward swing) with more sampling. Instead of or in addition to, the strongest of the lowest performing options may have an average performance only marginally worse than the weakest of the strongest performing options. Accordingly, even a slight increase in the average performance of the strongest of the weakest performing options may make it one of the highest performing options. The selecting 230 of the weakest of the highest performance options and the strongest of the lowest performing options may be carried out, for example, by a least confident options selection circuit 330 of FIG. 3 on the master edge server. The other edge servers may not be aware of the selecting 230.

The method 200 then proceeds with testing 240 the confidence in choice of the highest performing options. As discussed above, the described techniques are PAC techniques. Accordingly, option selection is not necessarily precise, but it is usually ("probably") within a predefined tolerance ("approximately correct") of providing a precisely correct answer. When the PAC criteria are such that the sampled highest performing options are close enough to (e.g., within 5% of) the actual highest performing options (within a certain likelihood, such as 90%), the method 200 terminates with outputting 250 the highest performing options. The testing 240 may be performed, for example, by a termination deciding circuit 340 of FIG. 3 while the outputting 250 may be performed by an output circuit 350 of FIG. 3. The termination deciding circuit 340 and the output circuit 350 may be on the master edge server. The other edge servers may not be aware of the testing 240 and the outputting 250.

Otherwise, the method 200 proceeds with further sampling 260 the selected options (i.e., the weakest of the highest performing options and the strongest of the lowest performing options) and updating the computed average performances accordingly. For example, the selected options could be sampled similarly to the initial sampling 210, (e.g., three hours or for so many visitors). The sampling can be distributed over the multiple edge servers, each edge server doing a portion of the sampling for each of the two options and communicating the results of the sampling to the master edge server. The further sampling 260 may be performed by the further sampling circuit 360 of FIG. 3, which may be part of each of the edge servers. Processing then repeats with the option splitting 220, this time based on the updated average performances of the selected options.

Referring to FIG. 3, the k-best option identification circuit 300 includes the initial sampling circuit 310, which receives as input the M alternative options (as well as any other inputs, such as tolerance and confidence values). For the master edge server, the initial sampling circuit 310 distributes the sampling (or the options) across multiple edge servers, receives the collected sampling data from the different edge servers, and computes the average performances of the options (such as average CTRs) while maintaining components of these performances (e.g., counts, means, variances) for evaluating the different options. The identification circuit 300 further includes the option splitting circuit 320, which splits the options between the highest performing options and the lowest performing options. For example, the highest performing options may represent those options that the identification circuit 300 identifies after the sampling up till now as the most likely to be the best k options, such as having the best average performances. The identification circuit 300 further includes the least confident options selection circuit 330, which selects, for example, the weakest of the highest performing options (such as the highest performing option for which there is the least confidence that option will remain there) and the strongest of the lowest performing options (such as the lowest performing option for which there is the least confidence that option will remain there).

The identification circuit 300 further includes a termination deciding circuit 340, which decides if there is enough confidence that the sampled highest performing options are close enough to the actual highest performing options that the output circuit 350 can output the highest performing options. Otherwise, the identification circuit 300 includes a further sampling circuit 360, which on the master edge server, distributes the selected options to the other edge servers to further sample the selected options chosen by the selection circuit 330, collects the sampled data from each of the other edge servers, and updates the average performances of the selected options accordingly. Processing then repeats on the (now further sampled) options with the option splitting circuit 320.

Figure 4:
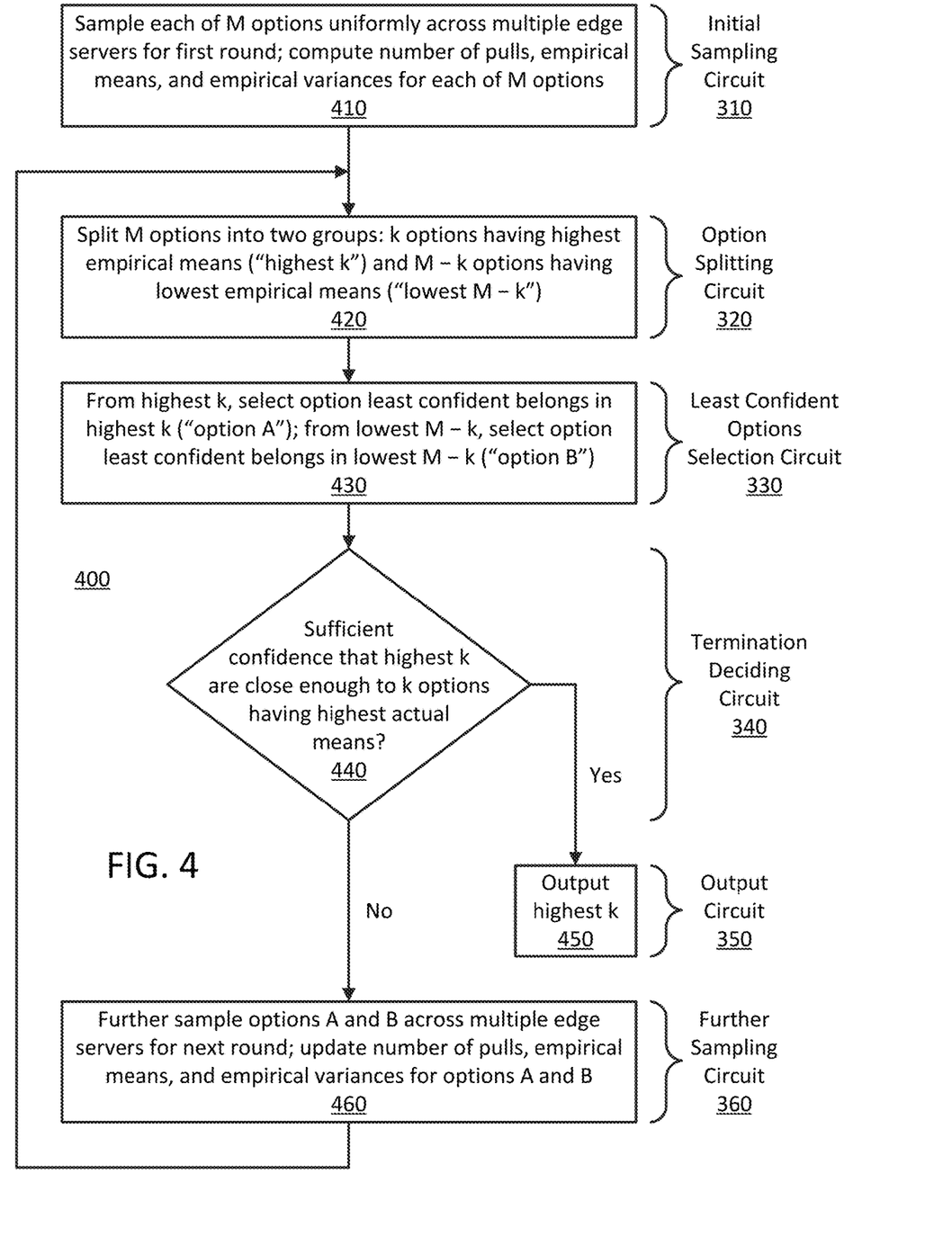
FIG. 4 is a flowchart illustrating an example computer-based method of k-best option identification according to another embodiment of the present disclosure.

FIG. 4 is a flowchart illustrating an example computer-based method 400 of k-best option identification according to another embodiment of the present disclosure. Method 400 further elaborates on method 200 described above. In addition, the processes and sub-processes of method 400 can be performed, for example, by the k-best option identification circuit 300 of FIG. 3. Method 400 is described somewhat in terms of a corresponding multi-arm bandit algorithm. For example, options are sampled by "pulling" a corresponding arm of the multi-arm bandit.

In the method 400, processing begins with sampling 410 each of M options uniformly across multiple edge servers for the first round, collecting (at the master edge server) the sampling results from each of the edge servers, and computing (at the master edge server) the number of pulls, empirical means, and empirical variances of each of the M options. The options are treated as random variables having corresponding unknown average values (means) and variances, but that can be estimated through repeated sampling (pulling of the arms). For an online marketing application, each of the visitors to a webpage having a clickable link can randomly be shown a different one of M versions of the webpage during the course of a sampling period (such as three hours) and average CTRs established for each of the options (versions of the webpage). The sampling 410 can be performed, for example, by the initial sampling circuit 310 of FIG. 3, which may be part of all the edge servers.

Method 400 continues with splitting 420 the M options into two groups: the k options having the highest empirical means (also referred to as the "highest k") and the M−k options having the lowest empirical means (also referred to as the "lowest M−k"). The highest k represent those options most likely to be the best k options based on the sampled data so far. The option splitting 420 can be performed, for example, by the option splitting circuit 320 of FIG. 3, which may be part of the master edge server.

Next, method 400 does option selecting 430 of the option that there is the least confidence that option belongs in the highest k (call it option A) and the option that there is the least confidence that option belongs in the lowest M (call it option B). These may be options for which too little sampling has taken place. Accordingly, further sampling of these that differs from their previous sampling will have a larger effect on these options that on the other options (e.g., cause them to switch groups, or cause them to have a better confidence score that they are in the correct group). Instead of or in addition to, options A and B may be options that are very close to the cutoff or separation between the two groups. As such, even if these options have undergone more than the average amount of sampling among the options, they need only a relatively small number of samples to go the opposite way of their previous samples to switch them into the other group. The option selecting 430 can be done, for example, by the least confident options selection circuit 330 of FIG. 3, which may be part of the master edge server.

Next, method 400 does testing 440 to see if there is sufficient confidence that the highest k are close enough to the k options having the highest actual averages (means). This can be done by comparing options A and B. Since these are the two options having the least confidence to belong in their respective groups, if there is nonetheless sufficient confidence ("probably") that these options are close enough ("approximately correct") that further sampling is unlikely to produce a significantly different set of the highest k options, then further sampling can be terminated and processing can proceed to outputting 450 the highest k options so far. Further details of example ways of doing this confidence testing 440 are provided below. The confidence testing 440 can be done, for example, by the termination deciding circuit 340 of FIG. 3, while the outputting 450 can be performed by the output circuit 350. Both the termination deciding circuit 340 and the output circuit 350 may be part of the master edge server.

Otherwise, if the testing 440 does not reveal sufficient confidence in the present selection of the highest k, so processing proceeds with further sampling 460 options A and B across the multiple edge servers for the next round, collecting (at the master edge server) the new sampling results from each of the edge servers, and updating (at the master edge server) the number of pulls, the empirical means, and the empirical variances for options A and B to reflect the further sampling. For example, each of the options A and B may be subject to the same type of sampling done during the first round, say three hours of sampling at each of the edge servers, with half the visitors of the webpage at each edge server being sent to option A and the other half being sent to option B. The further sampling 460 can be performed, for example, by the further sampling circuit 360 of FIG. 3, which may be part of every edge server.

Figure 5:
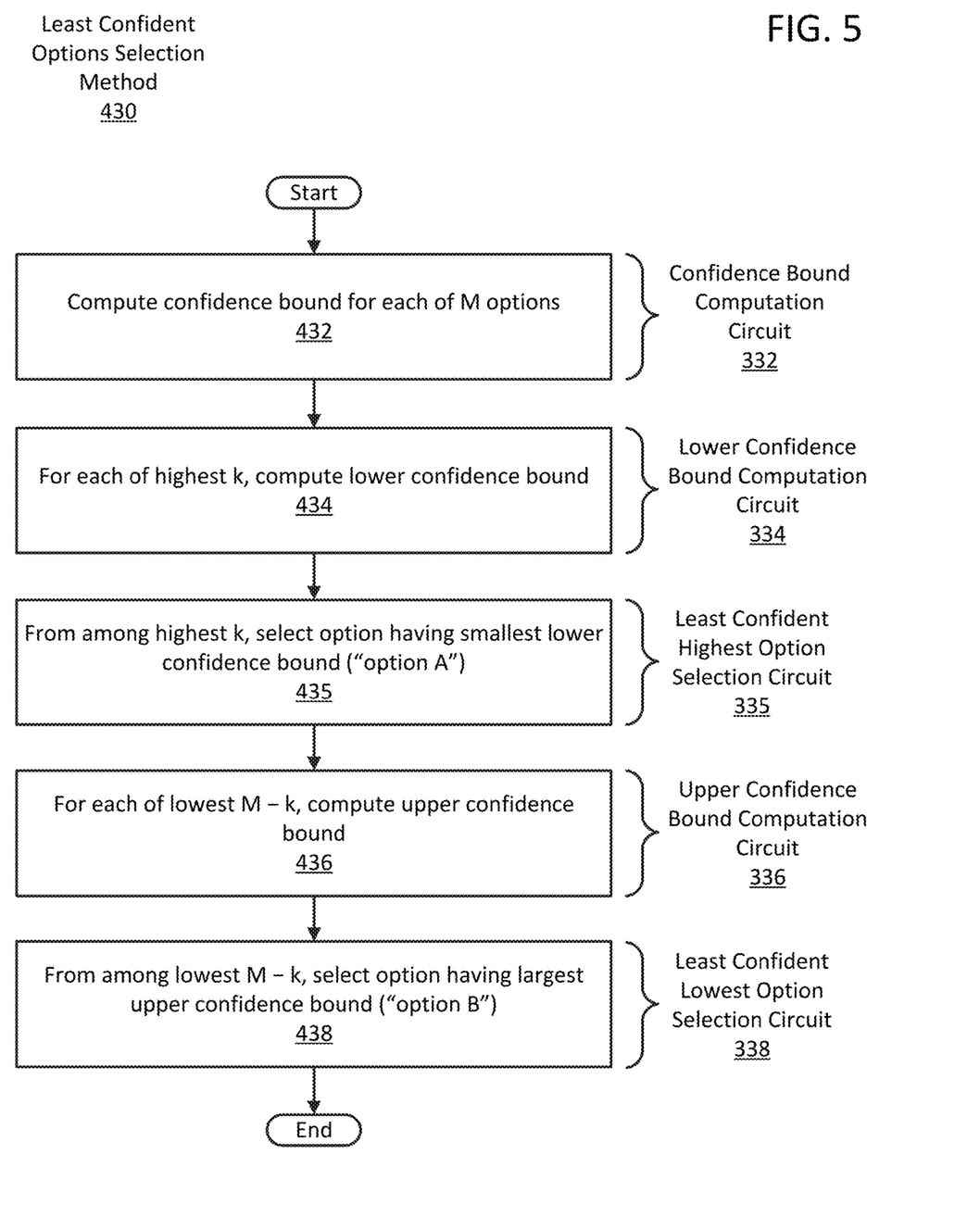
FIG. 5 is a flowchart illustrating an example computer-based method of least confident options selection of the k-best option identification method of FIG. 4 according to an embodiment of the present disclosure.
Figure 6:
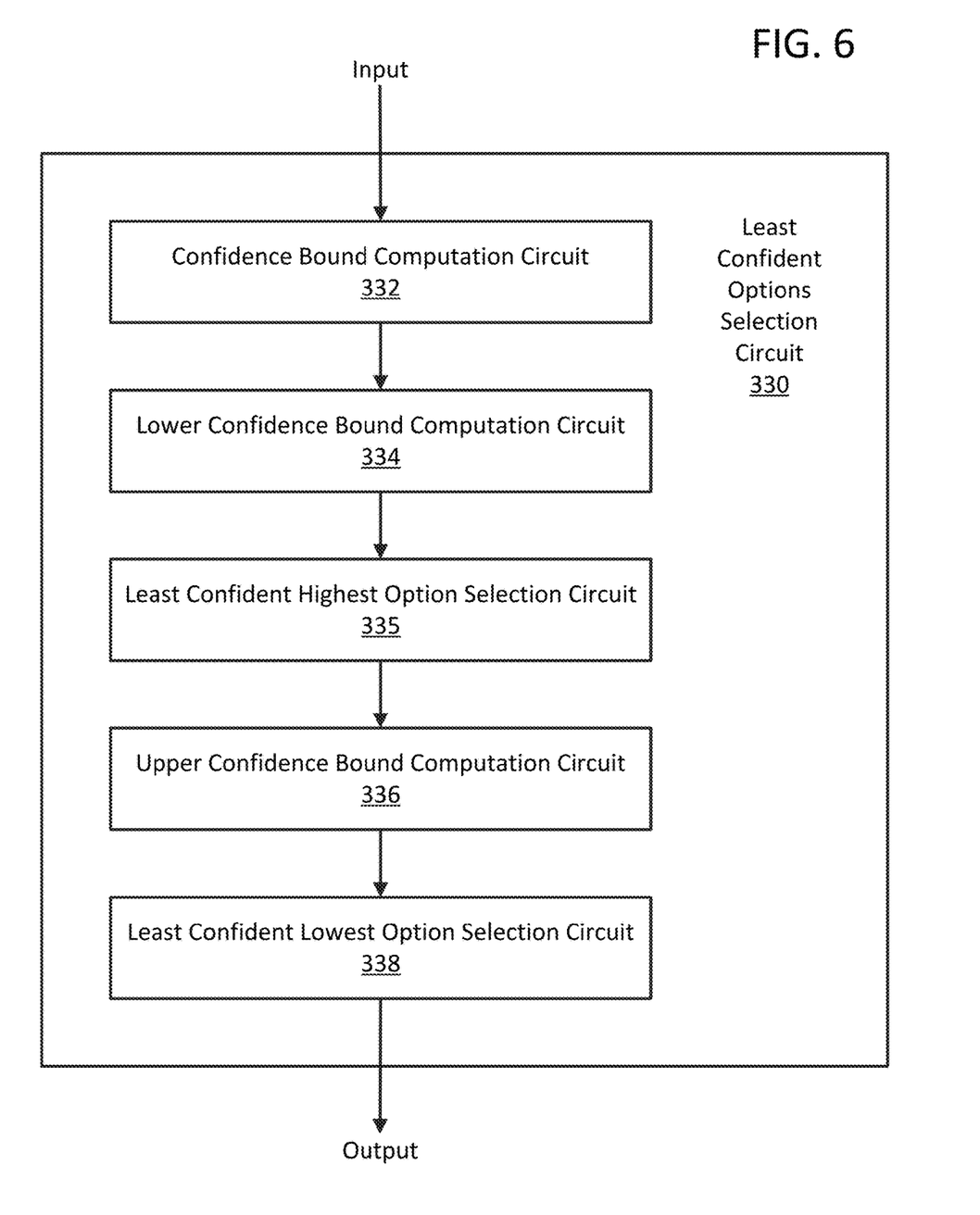
FIG. 6 is a block diagram of an example least confident options selection circuit of the k-best option identification circuit of FIG. 3 according to an embodiment of the present disclosure.

FIG. 5 is a flowchart illustrating an example computer-based method 430 of least confident options selection of the k-best option identification method 400 of FIG. 4 according to an embodiment of the present disclosure. FIG. 6 is a block diagram of an example least confident options selection circuit 330 of the k-best option identification circuit 300 of FIG. 3 according to an embodiment of the present disclosure. The least confident options selection process described above is amenable to multiple sub-processes, as the example embodiments in FIGS. 5-6 illustrate.

In the least confident options selection method 430, processing begins with computing 432 a confidence bound for each of the M options. Confidence bounds will be discussed in further detail below, but they provide the underlying mathematical foundation that allows techniques such as the embodiments described herein to complete in a finite number of rounds with certainty, and to produce answers that are as accurate as desired and with any degree of confidence. Part of PAC computing is establishing confidences (e.g., numbers representing "probably," such as 0.9 or 90% of the time) and tolerances (e.g., numbers representing "approximately correct," such as within 5% of the average value or mean), which are supplied as inputs to the techniques disclosed herein. It should be noted that while the techniques disclosed herein are guaranteed to stop after a finite number of rounds, the sampling complexity grows dramatically the closer the supplied tolerance gets to 0 or the closer the supplied confidence gets to 1 (or 100%). Accordingly, sensible selection of the supplied tolerance and confidence values enables all embodiments to perform very efficiently in real-life multiple hypothesis testing situations.

Computing the confidence bound, as discussed further below, can be an involved calculation, and can be a different value for each option, but if chosen appropriately, it guarantees that the PAC conditions are satisfied and that the k-best option identification method 400 terminates in a finite number of rounds. The confidence bound computation 432 can be performed, for example, by a confidence bound computation circuit 332 of FIG. 6.

Next, processing continues with, for each of the highest k, computing 434 a lower confidence bound. For each option, as computed in the confidence bound computation 432, there is a confidence bound b. There is also a sampled mean (or average value) $\mu$ for the option. It should be noted that the confidence bound b and the sampled mean $\mu$ can vary between options. This defines a confidence region between $\mu-b$ and $\mu+b$. b is defined such that, depending on the supplied confidence value (another input to the k-best option identification method 400, such as 0.9 or 90%), guarantees that the actual mean of the option is in the confidence region as frequently as specified by the confidence value (e.g., 90% of the time). It should be noted that the confidence bound b also depends on this confidence value, with larger confidence values (greater confidence) leading to larger confidence bounds b (and other attendant effects, such as more rounds for the method 400 to terminate). It should further be noted that the confidence bound b depends on the number of samples for the option, with greater sampling resulting in lower confidence bounds b. The lower confidence bound of the confidence region is then $\mu-b$. The lower confidence bound computing 434 can be performed, for example, by a lower confidence bound computation circuit 334 of FIG. 6.

The method 430 then continues with, from among the highest k, selecting 435 the option having the smallest lower confidence bound of its corresponding confidence region. The selected option is also referred to as option A in earlier descriptions. Since each option can have a different confidence bound b as well as a different mean $\mu$, the lower confidence bounds $\mu-b$ of the different options can vary because of the effects of both the mean $\mu$ and the confidence bound b (e.g., smaller mean $\mu$ leading to a smaller lower confidence bound, smaller confidence bound b resulting in a larger lower confidence bound, and the like). Smaller confidence bounds b can, in turn, result from increased sampling of the option. Option A thus represents the option from the highest k for which there is the least confidence that option belongs in the highest k. The least confident option selecting 435 can be performed, for example, by a least confident highest option selection circuit 335 of FIG. 6.

Processing continues with, for each of the lowest M−k, computing 436 an upper confidence bound of a confidence region. Similar to the discussion above regarding the lower confidence bound computations (only on the other end of the confidence region), the upper confidence bound of the confidence region is $\mu+b$. The upper confidence bound computing 436 can be performed, for example, by an upper confidence bound computation circuit 336 of FIG. 6.

The method 430 then continues with, from among the lowest M−k, selecting 438 the option having the largest upper confidence bound of its corresponding confidence region. The selected option is also referred to as option B in earlier descriptions. As with the discussion above regarding the smallest lower confidence bound selection, the upper confidence bounds $\mu+b$ of the different options can vary because of the effects of both the mean $\mu$ and the confidence bound b (e.g., higher mean $\mu$ leading to a larger upper confidence bound, smaller confidence bound b resulting in a smaller upper confidence bound, and the like). Option B thus represents the option from the lowest M−k for which there is the least confidence that option belongs in the lowest M−k. The least confident option selecting 438 can be performed, for example, by a least confident lowest option selection circuit 338 of FIG. 6.

Referring to FIG. 6, the least confident options selection circuit 330 includes the confidence bound computation circuit 332, which receives as input the options split into two groups: the highest k and the lowest M−k. The confidence bound computation circuit 332 computes the confidence bound b for each of the M options. The computed confidence bound may be different for each option. The options selection circuit 330 further includes the lower confidence bound computation circuit 334, which, for each of the highest k, computes the lower confidence bound of the confidence region based on the sampled mean μ and the confidence bound b. For example, as computed above, the lower confidence bound is μ−b. The least confident highest option selection circuit 335 then selects the option from the highest k having the smallest lower confidence bound (i.e., option A). In a similar fashion, the options selection circuit 330 further includes the upper confidence bound computation circuit 336, which, for each of the lowest M−k, computes the upper confidence bound of the confidence region based on the sampled mean μ and the confidence bound b. For example, as computed above, the upper confidence bound is μ+b. The least confident lowest option selection circuit 338 then selects the option from the lowest M−k having the largest upper confidence bound (i.e., option B). The least confident options selection circuit 330 then outputs options A and B.

Confidence Bound Calculation

The following provides some guidance on the calculation of a confidence bound. LUCB uses a Chernoff-Hoeffding bound to define a confidence bound. The Chernoff-Hoeffding inequality states that with probability at least 1−δ (or with at least confidence 1−δ), $$|\hat{\mu}(t) - \mu| \le R\sqrt{\frac{\ln(2/\delta)}{t}}$$

where the "^" symbol over any variable (such as mean μ) represents "empirical" or "measured" or "computed" value, as opposed to the plain symbol, which represents the actual value. Here, t represents the number of random variables $X_i$ (e.g., the number of options, denoted as M above), each being independent and identically distributed and having actual mean μ, while R represents the range of the random variables that model the option selection. For example, with Bernoulli random variables, R=1.

By contrast, one or more embodiments of the present disclosure are based on a Bernstein bound, which is more appropriate for distributions such as Bernoulli distribution with low conversion rate (i.e., small value of p). The Bernstein inequality states that with probability at least 1−δ, $$|\hat{\mu}(t) - \mu| \le \hat{\sigma}(t)\sqrt{\frac{2\ln(3/\delta)}{t}} + \frac{3R\ln 3/\delta}{t}$$

where σ is the standard deviation of the random variables (and $\sigma^2$ is the variance). Because some of the embodiments of the present disclosure are directed towards Bernoulli random variables with small means (conversion rates) μ, they also possess small variances $\sigma^2$ (or standard deviations σ). Accordingly, such distributions produce first terms on the right of the Bernstein inequality that diminish when compared to the second terms, which allows the Bernstein inequality to be a better bound for larger numbers of options than the Chernoff-Hoeffding bound.

In some embodiments of the present disclosure, the unbiased estimate for the empirical variance is used, i.e., $$\hat{\sigma}^2(t) = \frac{1}{t-1}\sum_{j=1}^{t}(X_j - \hat{\mu}(t))^2.$$

Here, $X_j$ is the jth (of t) random variable (option). In addition, rounds are significantly larger in some embodiments of the present disclosure compared to LUCB (which use fixed rounds of two samples for each succeeding round after the initial round of M samples). By contrast, in some embodiments of the present disclosure, there can be thousands of samples (e.g., visitors) each sampling period (e.g., 3 hours) for each option.

For example, if 3C is used to denote the number of samples in the first round of one or more embodiments of the present disclosure, then C provides a good input for defining a confidence bound that is guaranteed (under the Bernstein inequality) to converge (or terminate) with the desired tolerance and confidence values. One such confidence bound (denoted b above) is $$\beta(T_i(t), t) = \sqrt{\frac{2\hat{\sigma}_i^2(t)}{T_i(t)}\ln\left(\frac{5M(Ct)^{2.1}}{\delta}\right)} + \frac{7}{3(T_i(t)-1)}\ln\left(\frac{5M(Ct)^{2.1}}{\delta}\right)$$

where $\beta(T_i(t),t)$ is the confidence bound of arm i at round t.

Here, t represents the number of rounds, β represents the same role b does above (e.g., gets added to or subtracted from the empirical or sampled mean μ to determine upper or lower confidence bounds), and $T_i(t)$ represents the number of samples collected for the ith option after the tth round.

In other embodiments of the present disclosure, smaller values of C can be used for the confidence bound computations, such as values that are proportional to the number of visitors (samples) in each round rather than the number of samples in the first round. Further, if the number of options is large, it may make more sense (to make the technique converge quicker) to choose two or three options from the highest group and from the lowest group each round, and sample each of these groups for the round.

Further Example Embodiments

The following examples pertain to further embodiments, from which numerous permutations and configurations will be apparent.

Example 1 is a multiple-computer-implemented method of k-best option identification. The method includes: sampling, on each of a plurality of computers, each of a plurality of options for a first period; computing, on one of the computers, for each of the options, an average and a sample count for the option based on corresponding said first period sampling of the option on each of the computers; splitting, by the one of the computers, the options into a highest group including k of the options and a lowest group including remaining ones of the options, the computed average of each of the highest group being no less than the computed average of each of the lowest group; selecting, by the one of the computers, a weakest one of the highest group (option A) and a strongest one of the lowest group (option B) based on the computed averages, the sample counts, and a supplied confidence of falling within a supplied tolerance of correctness, option A being one of the highest group for which there is least confidence that option belongs in the highest group, and option B being one of the lowest group for which there is least confidence that option belongs in the lowest group; and deciding, by the one of the computers, whether or not to terminate based on the supplied tolerance and the selecting of options A and B.

Example 2 includes the subject matter of Example 1. The method further includes: outputting, by the one of the computers, the highest group in response to the decision to terminate; and in response to the decision not to terminate, further sampling, on each of the computers, each of options A and B for a next period; updating, on the one of the computers, for each of options A and B, the computed average and the sample count for the option based on corresponding said next period sampling of the option on each of the computers; and repeating the splitting, the selecting, the deciding, and either the outputting or the further sampling and the updating based on the latest termination decision.

Example 3 includes the subject matter of Example 2. In addition, the selecting includes computing, for each of the options, a confidence bound based on the sample counts and the supplied confidence of falling within the supplied tolerance.

Example 4 includes the subject matter of Example 3. The selecting further includes: computing, for each of the highest group, a lower confidence bound based on the computed average and the computed confidence bound; and computing, for each of the lowest group, an upper confidence bound based on the computed average and the computed confidence bound.

Example 5 includes the subject matter of Example 4. In addition, in the selecting of options A and B, option A has a smallest said lower confidence bound of any of the highest group, and option B has a largest said upper confidence bound of any of the lowest group.

Example 6 includes the subject matter of Example 2. In addition, the computing for each of the options includes computing a variance for the option based on the corresponding first period sampling of the option on each of the computers, the selecting is further based on the computed variances, and the updating for each of options A and B includes updating the computed variance for the option based on the corresponding next period sampling of the option on each of the computers.

Example 7 includes the subject matter of Example 6. In addition, the selecting includes computing, for each of the options, a confidence bound based on the computed variance, the sample count, and the supplied confidence of falling within the supplied tolerance.

Example 8 includes the subject matter of Example 7. The selecting further includes: computing, for each of the highest group, a lower confidence bound based on the computed average and the computed confidence bound, option A having a smallest said lower confidence bound of any of the highest group; and computing, for each of the lowest group, an upper confidence bound based on the computed average and the computed confidence bound, option B having a largest said upper confidence bound of any of the lowest group.

Example 9 is a computer program product including one or more non-transitory machine readable mediums encoded with instructions that when executed by a plurality of computers cause a multiple-computer-implemented process to be carried out for k-best option identification. The process includes: sampling, on each of the computers, each of a plurality of options for a first period; computing, on one of the computers, for each of the options, an average and a sample count for the option based on corresponding said first period sampling of the option on each of the computers; splitting, by the one of the computers, the options into a highest group including k of the options and a lowest group including remaining ones of the options, the computed average of each of the highest group being no less than the computed average of each of the lowest group; selecting, by the one of the computers, a weakest one of the highest group (option A) and a strongest one of the lowest group (option B) based on the computed averages, the sample counts, and a supplied confidence of falling within a supplied tolerance of correctness, option A being one of the highest group for which there is least confidence that option belongs in the highest group, and option B being one of the lowest group for which there is least confidence that option belongs in the lowest group; and deciding, by the one of the computers, whether or not to terminate based on the supplied tolerance and the selecting of options A and B.

Example 10 includes the subject matter of Example 9. The process further includes: outputting, by the one of the computers, the highest group in response to the decision to terminate; and in response to the decision not to terminate, further sampling, on each of the computers, each of options A and B for a next period; updating, on the one of the computers, for each of options A and B, the computed average and the sample count for the option based on corresponding said next period sampling of the option on each of the computers; and repeating the splitting, the selecting, the deciding, and either the outputting or the further sampling and the updating based on the latest termination decision.

Example 11 includes the subject matter of Example 10. In addition, the selecting includes computing, for each of the options, a confidence bound based on the sample counts and the supplied confidence of falling within the supplied tolerance.

Example 12 includes the subject matter of Example 11. The selecting further includes: computing, for each of the highest group, a lower confidence bound based on the computed average and the computed confidence bound; and computing, for each of the lowest group, an upper confidence bound based on the computed average and the computed confidence bound.

Example 13 includes the subject matter of Example 12. In addition, in the selecting of options A and B, option A has a smallest said lower confidence bound of any of the highest group, and option B has a largest said upper confidence bound of any of the lowest group.

Example 14 includes the subject matter of Example 10. In addition, the computing for each of the options includes computing a variance for the option based on the corresponding first period sampling of the option on each of the computers, the selecting is further based on the computed variances, and the updating for each of options A and B includes updating the computed variance for the option based on the corresponding next period sampling of the option on each of the computers.

Example 15 includes the subject matter of Example 14. In addition, the selecting includes computing, for each of the options, a confidence bound based on the computed variance, the sample count, and the supplied confidence of falling within the supplied tolerance.

Example 16 includes the subject matter of Example 15. The selecting further includes: computing, for each of the highest group, a lower confidence bound based on the computed average and the computed confidence bound, option A having a smallest said lower confidence bound of any of the highest group; and computing, for each of the lowest group, an upper confidence bound based on the computed average and the computed confidence bound, option B having a largest said upper confidence bound of any of the lowest group.

Example 17 is a master computer for performing k-best option identification. The master computer includes: an initial sampling circuit to receive, from each of a plurality of other computers, sampling results for each of a plurality of options for a first period, and compute, for each of the options, an average and a sample count for the option based on corresponding said first period sampling of the option on each of the other computers; an option splitting circuit to split the options into a highest group including k of the options and a lowest group including remaining ones of the options, the computed average of each of the highest group being no less than the computed average of each of the lowest group; a least confident options selection circuit to select a weakest one of the highest group (option A) and a strongest one of the lowest group (option B) based on the computed averages, the sample counts, and a supplied confidence of falling within a supplied tolerance of correctness, option A being one of the highest group for which there is least confidence that option belongs in the highest group, and option B being one of the lowest group for which there is least confidence that option belongs in the lowest group; a termination deciding circuit to decide whether or not to terminate based on the supplied tolerance and the selecting of options A and B; an output circuit to output the highest group in response to the termination deciding circuit deciding to terminate; and a further sampling circuit to, in response to the termination deciding circuit deciding not to terminate, receive, from each of the other computers, further sampling results for each of options A and B for a next period, update, for each of options A and B, the computed average and the sample count for the option based on corresponding said next period sampling of the option on each of the other computers, and transfer control to the option splitting circuit to repeat the splitting, the selecting, the deciding, and either the outputting or the receiving further sampling results and the updating based on the latest termination decision.

Example 18 includes the subject matter of Example 17. In addition, the initial sampling circuit is further to distribute each of the options to each of the other computers, and the further sampling circuit is further to distribute options A and B to each of the other computers.

Example 19 includes the subject matter of Example 17. In addition, the least confident options selection circuit includes: a confidence bound computation circuit to compute, for each of the options, a confidence bound based on the sample counts and the supplied confidence of falling within the supplied tolerance; a lower confidence bound computation circuit to compute, for each of the highest group, a lower confidence bound based on the computed average and the computed confidence bound; a least confident highest option selection circuit to select option A as one of the highest group having a smallest said lower confidence bound; an upper confidence bound computation circuit to compute, for each of the lowest group, an upper confidence bound based on the computed average and the computed confidence bound; and a least confident lowest option selection circuit to select option B as one of the lowest group having a largest said upper confidence bound.

Example 20 includes the subject matter of Example 17. The initial sampling circuit is further to compute, for each of the options, a variance for the option based on the corresponding first period sampling of the option on each of the other computers, the least confident options selection circuit is further to select options A and B based on the computed variances, and the further sampling circuit is further to update, for each of options A and B, the computed variance for the option based on the corresponding next period sampling of the option on each of the other computers.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. In addition, various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A multiple-computer-implemented method of k-best option identification, the method comprising:
    establishing a content delivery network that comprises N edge servers, N>1, each of which is configured to serve web content, wherein a particular one of the N edge servers is designated as a master edge server;
    sampling, using the N edge servers, each of M options for a first period, M>1, wherein each of the M options corresponds to a webpage with which visitors can interact, wherein sampling each of the M options comprises using each of the N edge servers to observe a plurality of visitor interactions with each of the M options, and wherein each observed visitor interaction corresponds to a sampling event;
    computing, using each of the N edge servers, for each of the M options, an average and a sample count based on sampling during the first period, wherein the average corresponds to a rate at which visitors were observed to have converted their observed interactions with the webpage for the corresponding one of the M options, wherein the rate corresponds to a ratio of a number of observed interactions that resulted in conversion to the sample count, and wherein the sample count corresponds to a number of observed interactions with the webpage for the corresponding one of the M options;
    splitting, by the master edge server, the M options into a highest group including k of the M options and a lowest group including (M−k) remaining ones of the M options, the average for each of the k options in the highest group being no less than the average for each of the (M−k) options in the lowest group;
    selecting, by the master edge server, a weakest option of the highest group (option A) and a strongest option of the lowest group (option B) based on the averages, the sample counts, and a supplied confidence of falling within a supplied tolerance of correctness, option A having a confidence of belonging in the highest group that is lowest amongst the k options, and option B having a confidence of belonging in the lowest group that is lowest amongst the (M−k) options; and making a decision, by the master edge server, whether to use at least some of the N edge servers to perform further sampling of at least some of the M options based on the supplied confidence of falling within the supplied tolerance of correctness, the confidence of option A belonging in the highest group, and the confidence of option B belonging in the lowest group.

2. The method of claim 1, wherein:
the decision is a decision to terminate further sampling of at least some of the M options;
the method further comprises outputting, by the master edge server, the highest group in response to making the decision to terminate further sampling of at least some of the M options; and
outputting the highest group comprises outputting one or more webpage identifiers.

3. The method of claim 1, wherein selecting further comprises computing, for at least some of the M options, a confidence bound based on the sample count for the corresponding one of the M options and the supplied confidence of falling within the supplied tolerance.

4. The method of claim 3, wherein selecting further comprises:
computing, for at least some of the k options in the highest group, a lower confidence bound based on the average for the corresponding one of the k options and the confidence bound for the corresponding one of the k options; and
computing, for at least some of the (M−k) options in the lowest group, an upper confidence bound based on the average for the corresponding one of the (M−k) options and the confidence bound for the corresponding one of the (M−k) options.

5. The method of claim 4, wherein option A has a smallest lower confidence bound among the k options in the highest group, and option B has a largest upper confidence bound among the (M−k) options in the lowest group.

6. The method of claim 3, further comprising:
computing a variance for at least some of the M options based on sampling during the first period; and
selecting options A and B is further based on the variances.

7. The method of claim 6, wherein the confidence bound is further based on the variance.

8. The method of claim 7, wherein selecting further comprises:
computing, for at least some of the k options in the highest group, a lower confidence bound based on the average for the corresponding one of the k options and the confidence bound for the corresponding one of the k options, option A having a smallest lower confidence bound among the k options in the highest group; and
computing, for at least some of the (M−k) options in the lowest group, an upper confidence bound based on the average for the corresponding one of the (M−k) options and the confidence bound for the corresponding one of the (M−k) options, option B having a largest said upper confidence bound among the (M−k) options in the lowest group.

9. A computer program product including one or more non-transitory machine readable mediums encoded with instructions that when executed by a plurality of computers cause a process to be carried out for k-best option identification, the process comprising:

establishing a content delivery network that comprises N edge servers, N>1, each of which is configured to serve web content, wherein a particular one of the N edge servers is designated as a master edge server;
sampling, using the N edge servers, each of M options for a first period, M>1, wherein each of the M options corresponds to a webpage with which visitors can interact, wherein sampling each of the M options comprises using each of the N edge servers to observe a plurality of visitor interactions with each of the M options, and wherein each observed visitor interaction corresponds to a sampling event;
computing, using each of the N edge servers, for each of the M options, an average and a sample count based on sampling during the first period, wherein the average corresponds to a rate at which visitors were observed to have converted their observed interactions with the webpage for the corresponding one of the M options, wherein the rate corresponds to a ratio of a number of observed interactions that resulted in conversion to the sample count, and wherein the sample count corresponds to a number of observed interactions with the webpage for the corresponding one of the M options;
splitting, by the master edge server, the M options into a highest group including k of the M options and a lowest group including (M−k) remaining ones of the M options, the average for each of the k options in the highest group being no less than the average for each of the (M−k) options in the lowest group;
selecting, by the master edge server, a weakest option of the highest group (option A) and a strongest option of the lowest group (option B) based on the averages, the sample counts, and a supplied confidence of falling within a supplied tolerance of correctness, option A having a confidence of belonging in the highest group that is lowest amongst the k options, and option B having a confidence of belonging in the lowest group that is lowest amongst the (M−k) options; and
making a decision, by the master edge server, whether to use at least some of the N edge servers to perform further sampling of at least some of the M options based on the supplied confidence of falling within the supplied tolerance of correctness, the confidence of option A belonging in the highest group, and the confidence of option B belonging in the lowest group.

10. The computer program product of claim 9, wherein:
the decision is a decision to perform further sampling of at least some of the M options; and
the process further comprises, in response to making the decision to perform further sampling of at least some of the M options,
further sampling, using the N edge servers, each of options A and B for a next period; and
computing, using each of the N edge servers, for each of options A and B, an updated average and an updated sample count based on sampling during the next period.

11. The computer program product of claim 9, wherein selecting further comprises computing, for at least some of the M options, a confidence bound based on the sample count for the corresponding one of the M options and the supplied confidence of falling within the supplied tolerance.

12. The computer program product of claim 11, wherein selecting further comprises:
computing, for at least some of the k options in the highest group, a lower confidence bound based on the average for the corresponding one of the k options and the confidence bound for the corresponding one of the k options; and computing, for at least some of the (M–k) options in the lowest group, an upper confidence bound based on the average for the corresponding one of the (M–k) options and the confidence bound for the corresponding one of the (M–k) options.

13. The computer program product of claim 12, wherein option A has a smallest lower confidence bound among the k options in the highest group, and option B has a largest upper confidence bound among the (M–k) options in the lowest group.

14. The computer program product of claim 11, wherein the process further comprises computing a variance for at least some of the M options based on sampling during the first period; and selecting options A and B is further based on the variances.

15. The computer program product of claim 14, wherein the confidence bound is further based on the variance.

16. The computer program product of claim 15, wherein selecting further comprises:

computing, for at least some of the k options in the highest group, a lower confidence bound based on the average for the corresponding one of the k options and the confidence bound for the corresponding one of the k options, option A having a smallest lower confidence bound among the k options in the highest group; and computing, for at least some of the (M–k) options in the lowest group, an upper confidence bound based on the average for the corresponding one of the (M–k) options and the confidence bound for the corresponding one of the (M–k) options, option B having a largest said upper confidence bound among the (M–k) options in the lowest group.

17. A content delivery network for performing k-best option identification, the content delivery network comprising N edge servers, N>1, each of which is configured to serve web content, wherein a particular one of the N edge servers is designated as a master edge server, and wherein the content delivery network is configured to:

obtain, using the N edge servers, sampling results for each of M options for a first period, M>1, wherein each of the M options corresponds to a webpage with which visitors can interact, wherein sampling each of the M options comprises using each of the N edge servers to observe a plurality of visitor interactions with each of the M options, and wherein each observed visitor interaction corresponds to a sampling event, and compute, using each of the N edge servers, for each of the M options, an average and a sample count based on sampling during the first period, wherein the average corresponds to a rate at which visitors were observed to have converted their observed interactions with the webpage for the corresponding one of the M options, wherein the rate corresponds to a ratio of a number of observed interactions that resulted in conversion to the sample count, and wherein the sample count corresponds to a number of observed interactions with the webpage for the corresponding one of the M options;

split, using the master edge server, the M options into a highest group including k of the M options and a lowest group including (M–k) remaining ones of the M options, the average for each of the k options in the highest group being no less than the average for each of the (M–k) options in the lowest group;

select, by the master edge server, a weakest option of the highest group (option A) and a strongest option of the lowest group (option B) based on the averages, the sample counts, and a supplied confidence of falling within a supplied tolerance of correctness, option A having a confidence of belonging in the highest group that is lowest amongst the k options, and option B having a confidence of belonging in the lowest group that is lowest amongst the (M–k) options; and make a decision, by the master edge server, whether to use at least some of the N edge servers to perform further sampling of at least some of the M options based on the supplied confidence of falling within the supplied tolerance of correctness, the confidence of option A belonging in the highest group, and the confidence of option B belonging in the lowest group.

18. The content delivery network claim 17, wherein the content delivery network is further configured to:

in response to deciding to perform further sampling, distribute options A and B to each of the N edge servers.

19. The content delivery network of claim 17, wherein the content delivery network is further configured to:

compute, for each at least some of the M options, a confidence bound based on the sample count for the corresponding one of the M options and the supplied confidence of falling within the supplied tolerance;

compute, for at least some of the k options in the highest group, a lower confidence bound based on the average for the corresponding one of the k options and the confidence bound for the corresponding one of the k options, wherein option A has a smallest lower confidence bound among the k options in the highest group; and compute, for at least some of the (M–k) options in the lowest group, an upper confidence bound based on the average for the corresponding one of the (M–k) options and the confidence bound for the corresponding one of the (M–k) options, wherein option B has a largest upper confidence bound among the (M–k) options in the lowest group.

20. The content delivery network of claim 17, wherein the content delivery network is further configured to:

compute a variance for at least some of the M options based on sampling during the first period, and select options A and B based on the variances.

* * * * *